United States Patent [19]
Steinitz et al.

[11] Patent Number: 5,266,799
[45] Date of Patent: Nov. 30, 1993

[54] GEOPHYSICAL SURVEY SYSTEM

[75] Inventors: Gideon Steinitz, Jerusalem; Hovav Zafrir, Kfar Bilu; Yair Dubester, Kfar Sava, all of Israel

[73] Assignees: State of Israel, Ministry of Energy & Infastructure, Jerusalem; The State of Israel, Atomic Energy Commission, Yavne; Israel Aircraft Industries Ltd., Lod, all of Israel

[21] Appl. No.: 581,212

[22] Filed: Sep. 12, 1990

[30] Foreign Application Priority Data

Sep. 15, 1989 [IL] Israel ......................................... 91659

[51] Int. Cl.⁵ .............................. G01V 5/02; G01V 3/15
[52] U.S. Cl. ..................................... 250/253; 324/330
[58] Field of Search ................ 250/253, 342, 361 R, 250/370.11, 390.11, 261, 370.15, 352; 324/323, 329, 330, 331

[56] References Cited

U.S. PATENT DOCUMENTS

| | | |
|---|---|---|
| 3,825,751 | 7/1974 | Johnson, Jr. et al. .............. 250/253 |
| 4,245,479 | 1/1981 | Richter, Jr. et al. .......... 250/261 X |
| 4,342,032 | 7/1982 | Roesch et al. .................. 250/342 X |
| 4,517,459 | 5/1985 | Richter, Jr. et al. .............. 250/261 |
| 4,686,474 | 8/1987 | Olsen et al. .......................... 324/331 |
| 5,025,150 | 6/1991 | Oldham et al. ...................... 250/253 |

FOREIGN PATENT DOCUMENTS 0148704 7/1985 European Pat. Off. .
0158495 10/1985 European Pat. Off. .
61-155886 7/1986 Japan .

OTHER PUBLICATIONS

Peter Hood, "Mineral Exploration, Trends and developments in 1987" *Canadian Mining Journal,* vol. 109, No. 1, pp. 22–45, Jan. 1988.
Advisory Group Meeting on the Use of Airborne Radiometric Data to Define the Natural Background Radiation Environment. In Uranium Newsletter No. 1, IAEA, Vienna, 1987.
Military Drone Seen in Civilian Role. Toronto Globe and Mail Oct., 1987.
Mini Remotely Piloted Vehicle Systems in Mineral Exploration, Earth Sciences and Environmental Surveys, M. Granot et al., Presented at U.S.G.S. Workshop, Dev & Applic. Airborne Electromag. Survey, Oct. 1987.
Q. Bristow, "Airborne Gamma Ray Spectometry ... ", Int. Jou. of Applied Rad. and Isotopes, vol. 34, No. 1, Jan. 1983, Oxford, Great Britain, pp. 199–229.

*Primary Examiner*—Paul M. Dzierzynski
*Assistant Examiner*—Edward J. Glick
*Attorney, Agent, or Firm*—Darby & Darby

[57] ABSTRACT

A geophysical survey system including a remotely piloted vehicle, a geophysical sensing payload mounted thereon and ground based control and data receiving means.

18 Claims, 13 Drawing Sheets

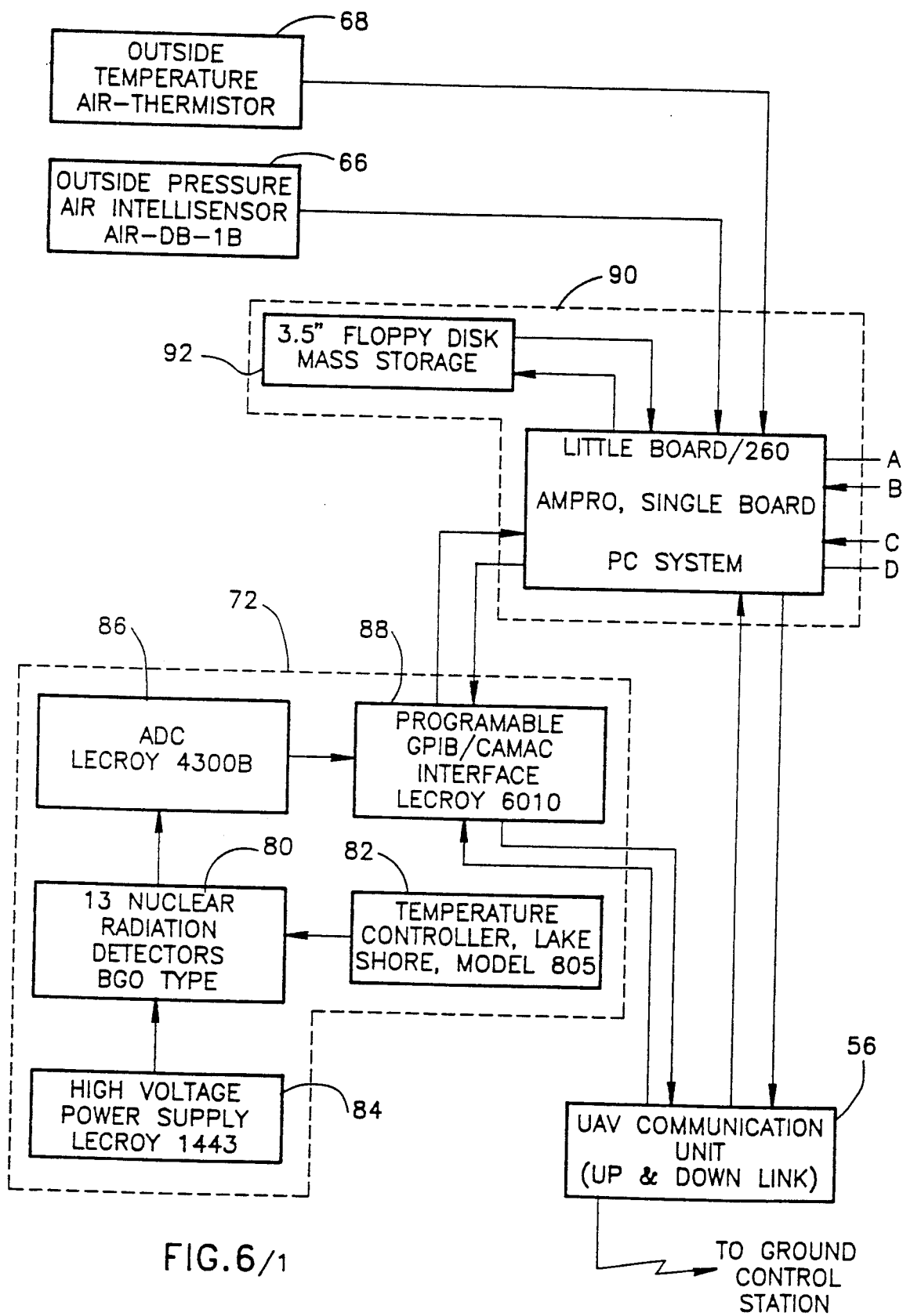
FIG.6/1

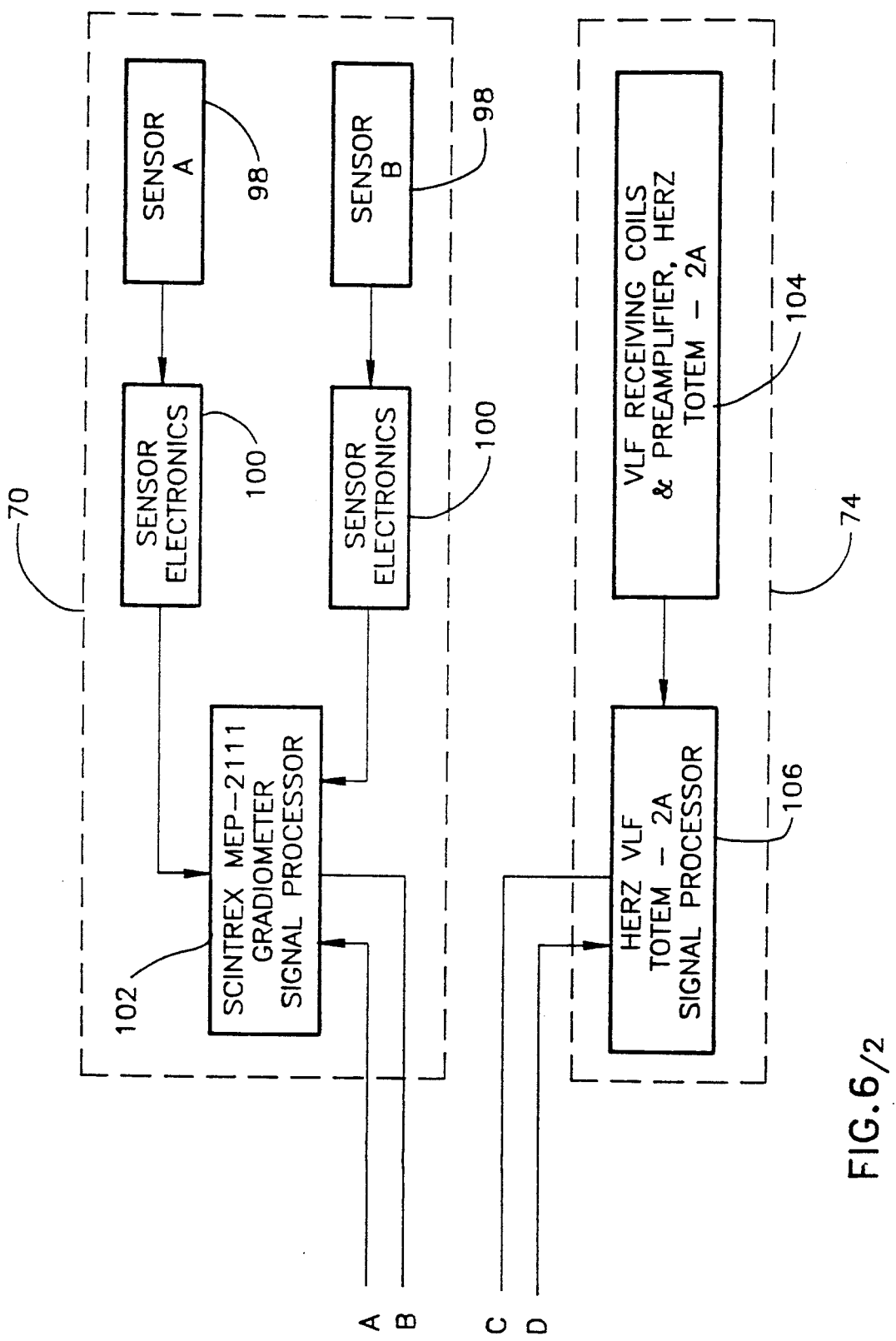
FIG.6/2

GEOPHYSICAL SURVEY SYSTEM

FIELD OF THE INVENTION

The present invention relates to surveying systems and techniques generally and more particularly to radiometric, magnetic and electro-magnetic surveying systems and techniques.

BACKGROUND OF THE INVENTION

Various techniques are employed for conducting geophysical surveys. Such surveys are typically carried out on land at great expense and require extensive commitments of time and manpower. Satellite surveys are also common but are limited in their sensitivity and resolution, inter alia due to limitations in signal to noise ratios prevalent in high altitude positioning. Aerial surveys are limited and dangerous as aircraft must fly relatively low (150-450 feet) in a proper reconnaissance sweep of a given territory. They normally cannot be carried out at night or in inclement weather.

Applicants have proposed the use of unmanned mini remotely piloted vehicle systems in mineral exploration, earth sciences and environmental surveys. Such systems have not yet been employed for such surveys.

A discussion of airborne radiometric surveys appears in Uranium Newsletter No. 1, IAEA, Vienna, 1987.

SUMMARY OF THE INVENTION

The present invention seeks to provide an airborne geophysical survey system and technique which has significant advantages over existing survey apparatus and techniques, in safety, cost, speed and survey quality.

There is thus provided in accordance with a preferred embodiment of the invention a geophysical survey system including a remotely piloted vehicle, a geophysical sensing payload mounted on the remotely piloted vehicle and ground based control and data receiving apparatus.

Further in accordance with a preferred embodiment of the invention, the ground based apparatus also includes data processing and hard copy output apparatus.

In accordance with a preferred embodiment of the present invention, there is provided a radiometric payload which comprises nuclear detectors, preferably miniaturized scintillator apparatus.

Additionally in accordance with a preferred embodiment of the present invention, the radiometric payload also comprises apparatus for cooling and temperature stabilizing the nuclear scintillators. Preferably the apparatus for cooling comprises a dewar.

Further in accordance with a preferred embodiment of the present invention, the ground based control and data receiving means comprises separate mobile tracking and communication and control and geophysical analysis units.

In accordance with a preferred embodiment of the invention, the separate units are interconnected by wireless relays.

BRIEF DESCRIPTION OF THE DRAWINGS

The present invention will be understood and appreciated more fully from the following detailed description, taken in conjunction with the drawings in which:

FIGS. 6/1 and 6/2 are a block diagram of geophysical payloads in accordance with a preferred embodiment of the present invention;

DETAILED DESCRIPTION OF A PREFERRED EMBODIMENT

Figure 1:
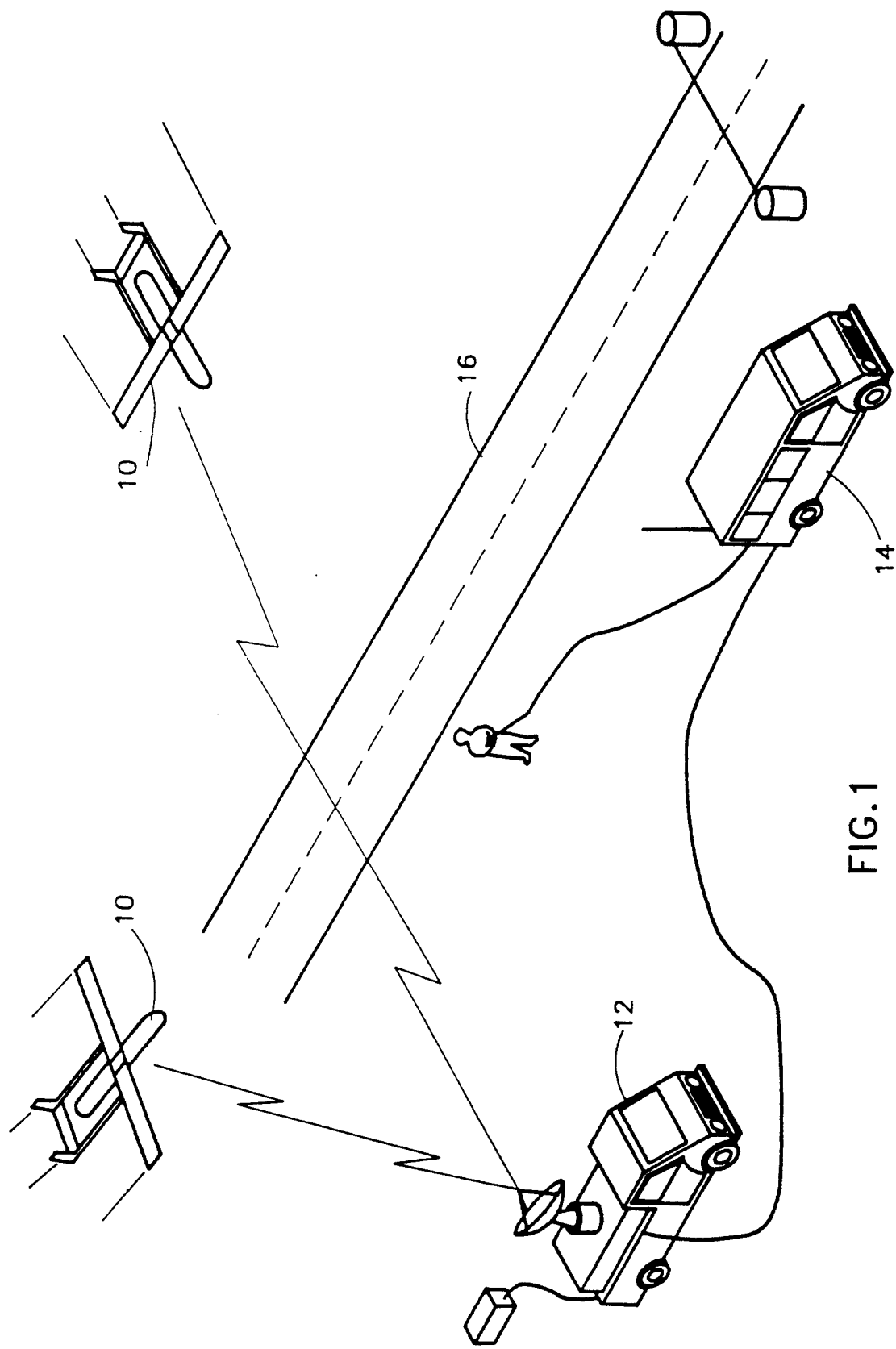
FIG. 1 is a pictorial illustration of a geophysical survey system constructed and operative in accordance with a preferred embodiment of the present invention.

Reference is now made to FIG. 1, which illustrates a geophysical survey system constructed and operative in accordance with a preferred embodiment of the present invention. The geophysical survey system preferably comprises one or more remotely piloted airborne vehicles 10, preferably such as the Searcher, which is commercially available from Isreal Aircraft Industries of Ben Gurion Airport, Israel.

Preferably the remote piloted vehicle 10 is operative at a preferred range of altitudes between 150-450 feet which, as contrasted from conventional airborne survey apparatus which operates at much higher altitudes, retains the benefits of airborne surveys but avoids many of the signal losses resulting from high altitudes.

Control of the operation of the remotely piloted airborne vehicles 10 is preferably achieved via radio links between vehicles 10 and a ground based mobile tracking and communication unit 12. Unit 12 may communicate with and/or be located adjacent a control and geophysical survey post 14. Take off and landing of the airborne vehicles 10 may employ any suitable runway road 16.

Figure 2:
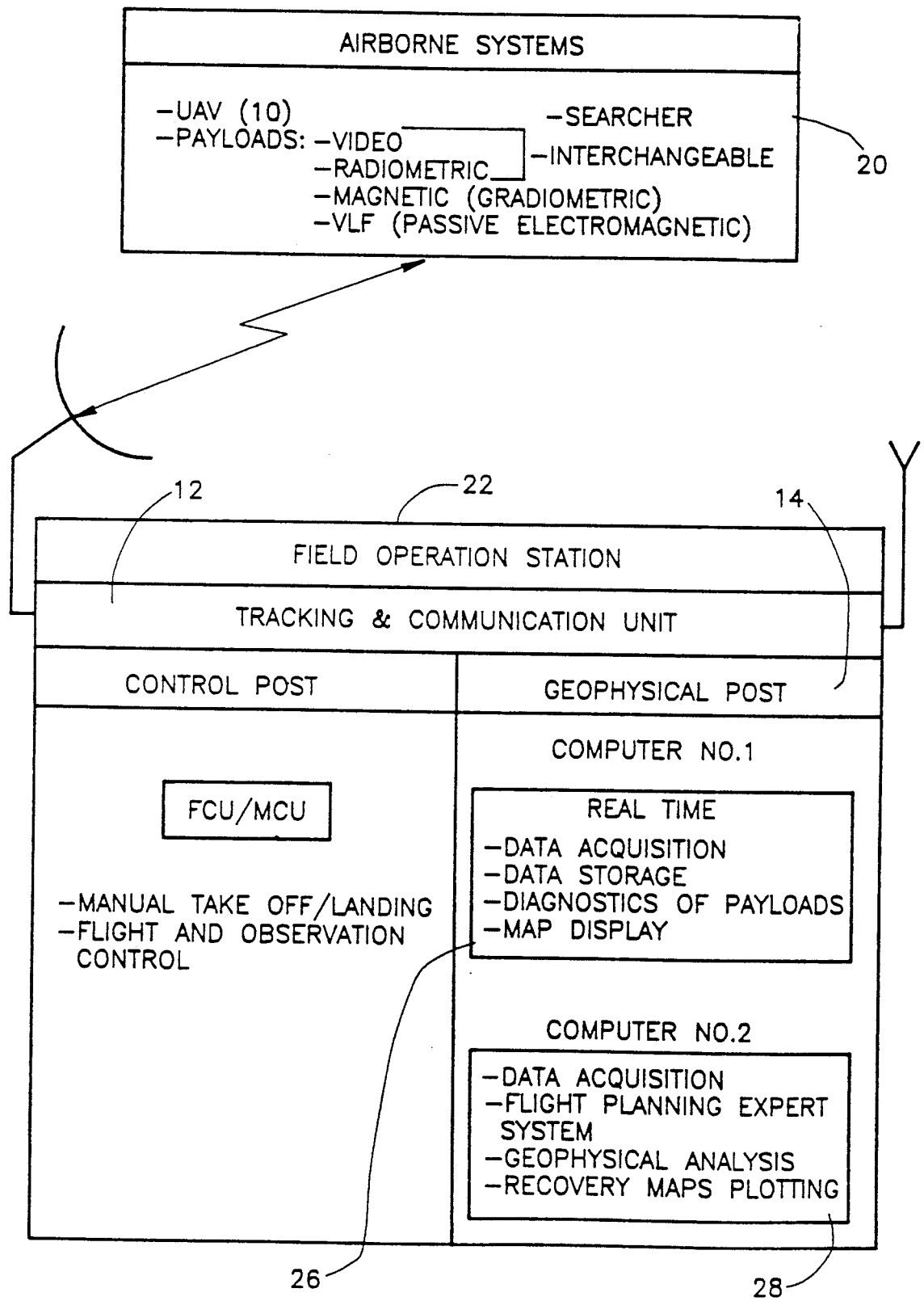
FIG. 2 is a generalized functional block diagram of the system of FIG. 1.

Reference is now made to FIG. 2, which is a generalized functional block diagram of the system of FIG. 1. From a consideration of FIG. 2 it is seen that the system may be broken down into airborne and ground portions. The airborne portion, indicated by reference numeral 20, includes the vehicle 10 and one or more geophysical payloads, including, for example, video and radiometric sensors which may be interchangeable, a magnetic sensor, preferably of the gradiometric type, such as two H-8 magnetometers produced by the Scintrex Corporation of Concord Ontario, Canada and a very low frequency passive electro-magnetic sensor, as in the Herz Industries Totem-2A, commercially available from HERZ Industries Ltd., 77 Finch Avenue East, Suite 362, Willowdale, Ontario M2N 6H8 Canada, operating at a frequency of 15 Khz to 25 Khz.

The ground portion, indicated generally by reference numeral 22 includes the tracking and communication unit 12 and the geophysical survey post 14. The control and communication unit 12 comprises a flight and mission control unit (FCU/MCU) which permits manual control of take off and landing and control of flight including video geophysical surveying.

Figure 3:
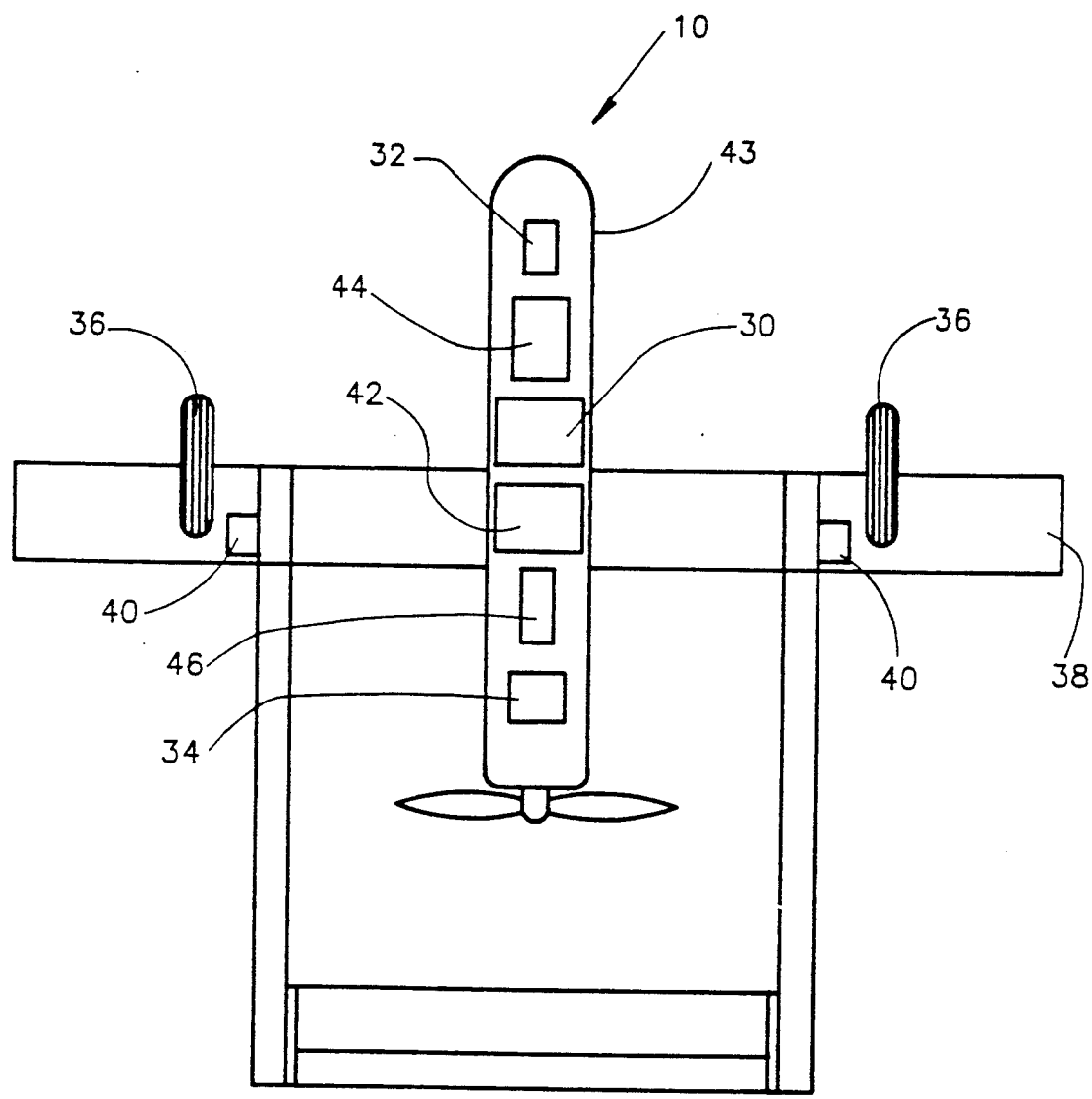
FIG. 3 is a simplified illustration of a layout of a pilotless vehicle forming part of the system of FIG. 1.

The geophysical post preferably includes one computer 26, such as a Micro Vax 3400 which provides real time data acquisition and storage as well as map display and payload diagnostics. A second computer 28 such as the Vax 3100 work station, provides intermediate and off-line data acquisition, geophysical analysis and plotting of recovery maps and may include an expert system for flight planning. Reference is now made to FIG. 3, which illustrates a preferred layout of an airborne system 20 (FIG. 2) on a remotely piloted airborne vehicle 10 such as the IAI "Searcher".

The following vehicle control systems form part of the commercially available vehicle 10 and are therefore not described herein with particularity: Avionics, GPS navigation system, terrain following and avoidance, video tape recorder and ground communication system. These systems are located at a control location 30 on the vehicle. The commercially available vehicle 10 also preferably includes a CCD boresight camera 32 located at a forward location in the vehicle and a parachute 34 located at a rearward location in the vehicle 10.

In accordance with a preferred embodiment of the present invention, magnetometer sensors 36, such as the Scintrex H-8 are mounted on each of the wings 38 of the vehicle 10 and are associated with sensor electronics 40. A magnetic and very low frequency signal processor such as a Scintrex MEP 2111 and Herz Totem-2A VLF receiver, commerically available from HERZ Industries Ltd., 77 Finch Avenue East, Suite 362, Willowdale, Ontario M2N 6H8 Canada; a radiometric multichannel analyzer such as a Lecroy 4300B ADC and 6010 programmable interface, commercially available from LECROY Corporation, 700 Chestnut Ridge Road, Chestnut Ridge, N.Y. 10977-6499, USA. a geophysical controller and a data link interface such as the Ampro, Little Board/286 Single board PC system, commercially available from AMPRO Computers Inc., 1130 Mountain View/Alviso Road, Sunnyvale, Calif., USA are all preferably located at a location 42 on the fuselage 43. Radiometric sensors, which will be described hereinbelow in greater detail, are preferably located in a housing 44. Very low frequency electromagnetic sensors, such as Herz Totem-2A VLF Em antennas and preamplifier are preferably located beneath the fuselage 43 at a location 46.

Figure 4:
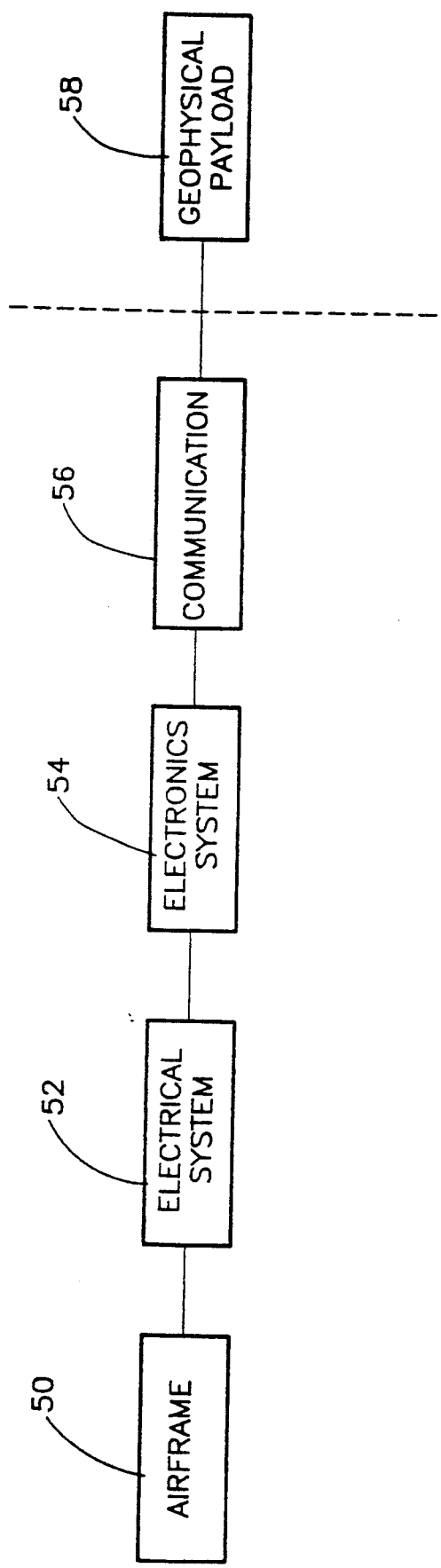
FIG. 4 is a simplified structural illustration of the components of the pilotless vehicle of FIG. 3.

Reference is now made to FIG. 4, which illustrates graphically the functional divisions between the various elements of the airborne portion 20 of the system of FIG. 2. Typically forming part of the commercially available vehicle 10 are the airframe 50, its electrical system 52, its electronics system 54 and its communication system 56. Communicating with these systems is the geophysical payload 58.

Figure 5:
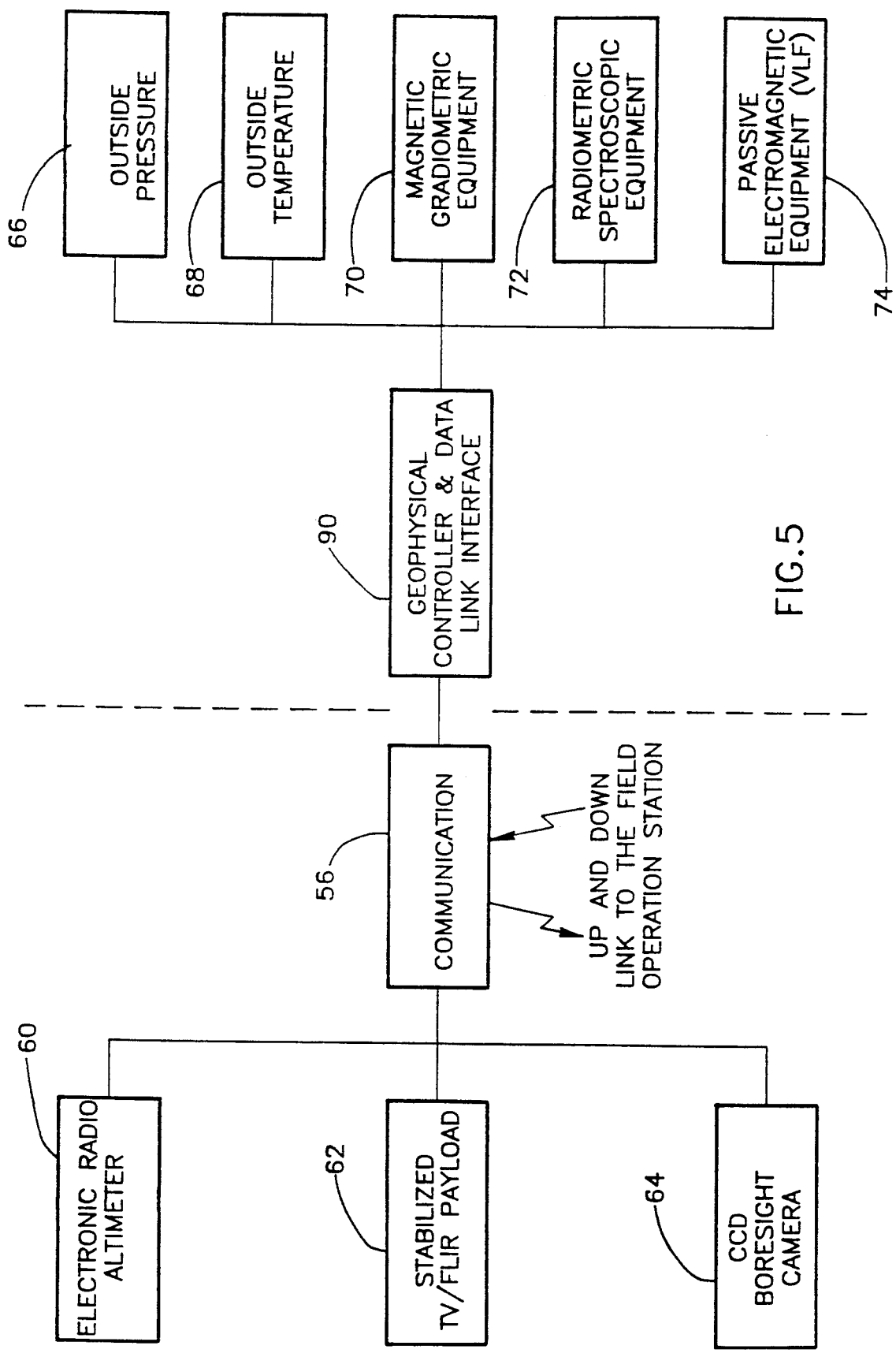
FIG. 5 is a simplified block diagram illustration of geophysical payloads which may be employed in accordance with the present invention.

The interaction between the aforesaid systems is illustrated in FIG. 5, in which it is seen that the vehicle systems including an electronic radio altimeter 60, a stabilized TV and FLIR (Infra Red) camera 62 and a CCD boresight camera 64 are linked to the ground via a communication system 56 as well as geophysical payload sensors including an outside pressure sensor 66, an outside temperature sensor 68, magnetic gradiometric equipment 70, radiometric spectroscopic equipment 72 and passive electro-magnetic equipment (VLF) 74, via geophysical controller and data link interface 90.

Reference is now made to FIGS. 6/1 and 6/2, which illustrate in detail, the interconnection of the various elements of the geophysical payload in accordance with a preferred embodiment of the present invention. As can be seen from a consideration of FIG. 6, a plurality of nuclear radiation detectors 80 of the BGO type, such as the Bicron Model 2M2BGO/2, commercially available from Bicron Corp. of Newberry, OH. USA, housed in a dewar, cooled and stabilized by a temperature controller 82, such as a Lake Shore, Model 805, commercially available from Lake Shore Cytronics, Inc. of Westerville, OH., and receive high voltage power from a Lecroy 1443 high voltage power supply 84, commercially available from the Lecroy Corp. Of Chestnut Ridge, N.Y.

The output of the radiation detectors 80 is supplied to an analog to digital converter 86, such as a Lecroy 4300B. The output of analog to digital converter 86 is supplied via a programmable GPIB/CAMAC interface 88 such as the Lecroy 6010, directly as 13 separate nuclear spectra to communications unit 56.

Interface 88 is preferably controlled by the main control 90, typically a Little Board/260 single board PC system commercially available from Ampro Computers Corp. of Sunnyvale, Calif. As part of the main control 90, there is also preferably provided a mass storage subsystem 92.

The outside environmental parameters are preferably measured by measurement apparatus 66, such as an AIR-DB-1B, commercially available from AIR-Atmospheric Instrumentation Research, Inc. of Boulder, Colo. and an outside temperature sensor 68, such as an Air 2 mm bead thermistor, which interface with the main controller 90.

A pair of Cesium magnetometers, each including a sensor portion 98 and an electromics portion 100, typically Scintrex H-8 models commercially available from Scintrex of Canada preferably are provided an output to a gradiometer signal processor 102, such as a Scintrex MEP-2111, which interfaces with the main controller 90.

Receiving coils 104 of a very low frequency electromagnetic receiver, typically a Herz Totem -2A model, commercially available from Herz Industries Ltd. Canada, output to an EM Signal processor 106 of the receiver, which interfaces withe the main controller 90.

Figure 7:
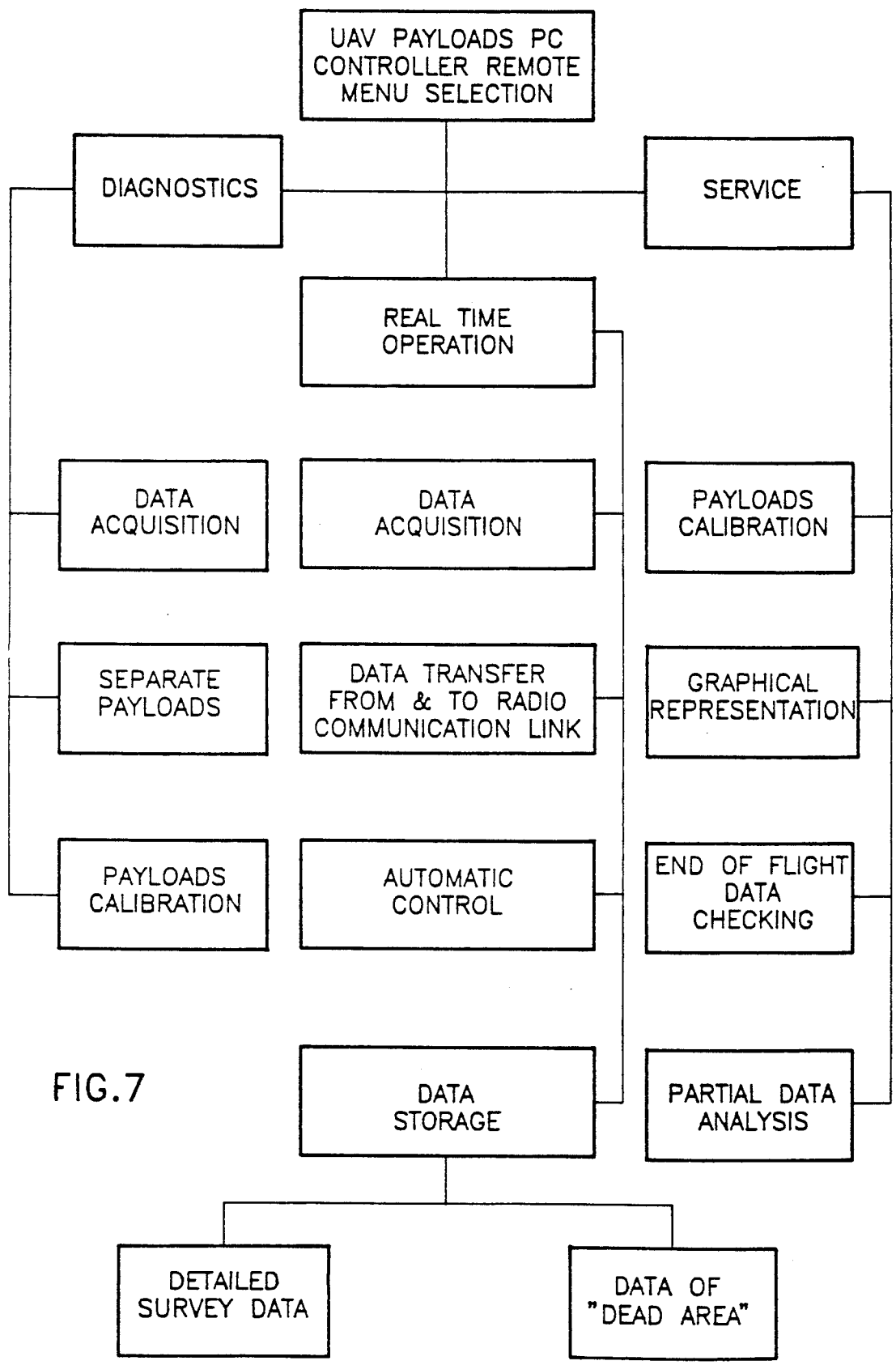
FIG. 7 is a software diagram illustrating the operation of the apparatus of FIG. 6.

Reference is now made to FIG. 7, which is a simplified software diagram of the system described in FIGS. 6/1 and 6/2. As indicated in FIG. 7, the main controller 90, operates in accordance with commands received through the telemetric uplink, to select an operation mode from a menu. The principle options are system diagnostics, service and real time operation. Service here is meant as the provision on an off-line basis of payload calibration, graphical representation of data, end of flight data checking and partial data analysis.

If real time operation is selected, data storage may occur including storage of detailed survey data and data of a "dead area" (data collection in areas which are not in line of sight with the ground station so the telemetric link cannot be used). Alternatively diagnostics may occur during the flight relating to data acquisition, separate payloads, working condition and calibration. The principal real-time operation function is automatic control of data acquisition and data transfer via the radio communication link.

Figure 8A:
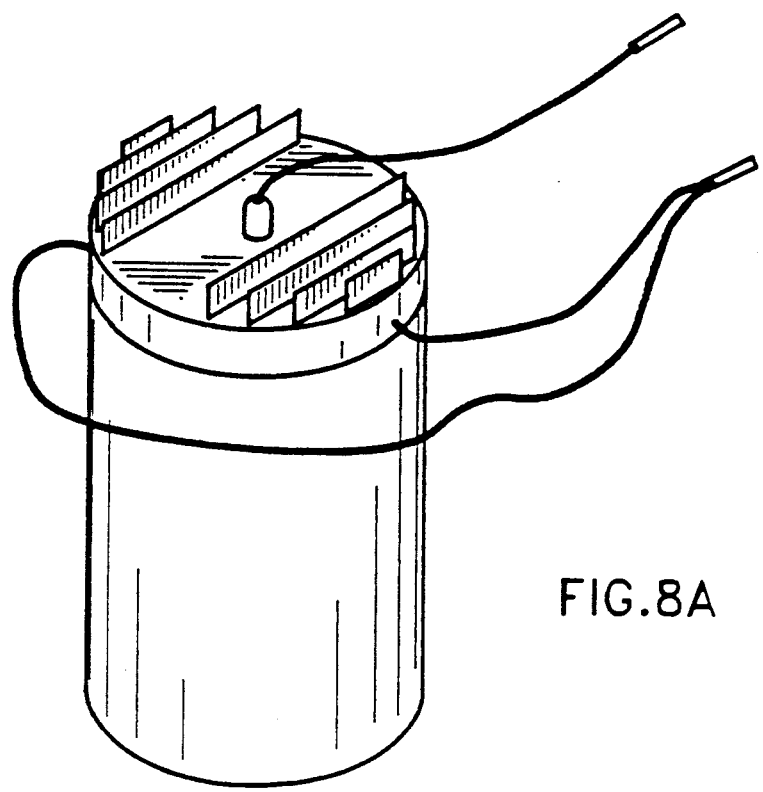
FIGS. 8A and 8B are respective pictorial and side sectional illustrations of a radiometric payload useful in the present invention.
Figure 8B:
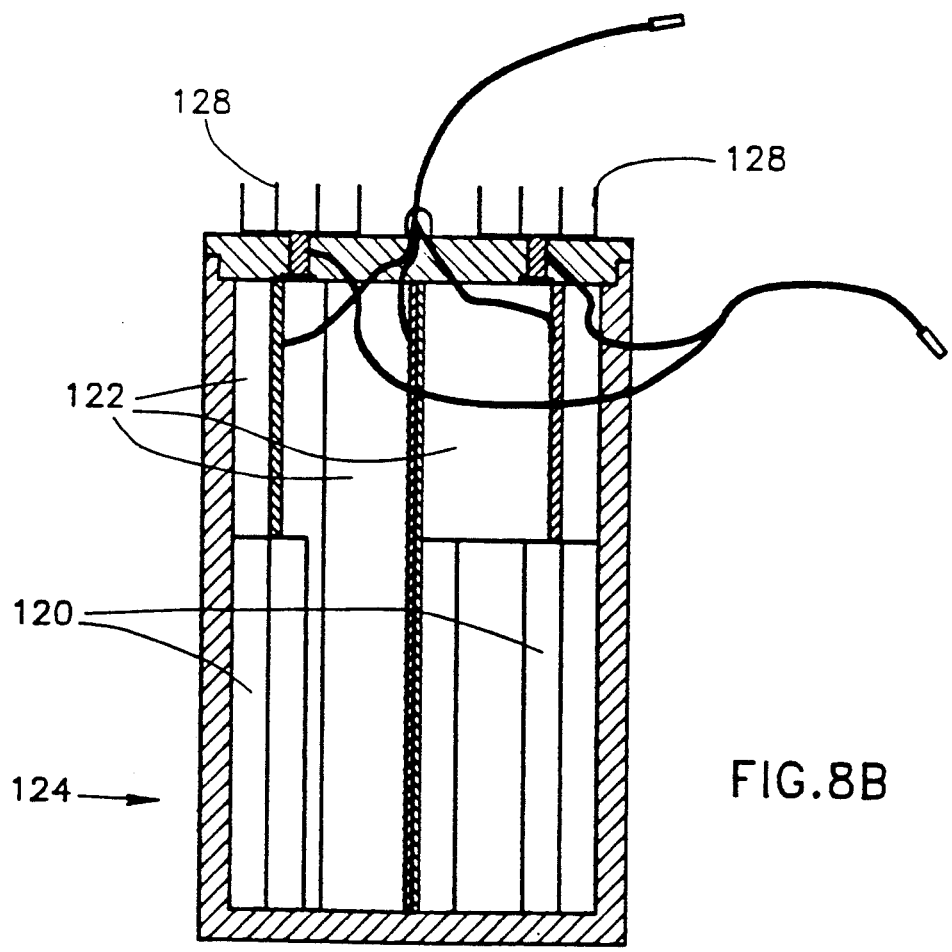

Reference is now made to FIGS. 8A and 8B which illustrate a preferred embodiment of a radioactivity spectroscopic payload. The payload comprises a nuclear detector apparatus, preferably a plurality of miniaturized nuclear scintillators 120, typically 4-13 in number. The scintillators are typically of the Bicron BGO type, commercially available from Bicron Corp. of Newberry, OH. and are associated with high voltage and processing electronics 122, such as the Lecroy 1443 and 4300B elements.

The scintillators 120 and electronics 122 are preferably located within a temperature isolated, evacuated housing 124, cooling of the scintillators 120 is preferably provided by thermoelectric cooling elements which dissipate the heat by heat convectors 128, such as Melcor cooling elements Models CP 1.4 127 062 and CP 1.0-127 062.

It is a particular feature of the present invention, that the radiometric payload is relatively compact efficient and of low weight and thus may be carried on a relatively small remotely piloted vehicle. Typical weight of the radiometric payload is less than 20 Kg.

Figure 9:
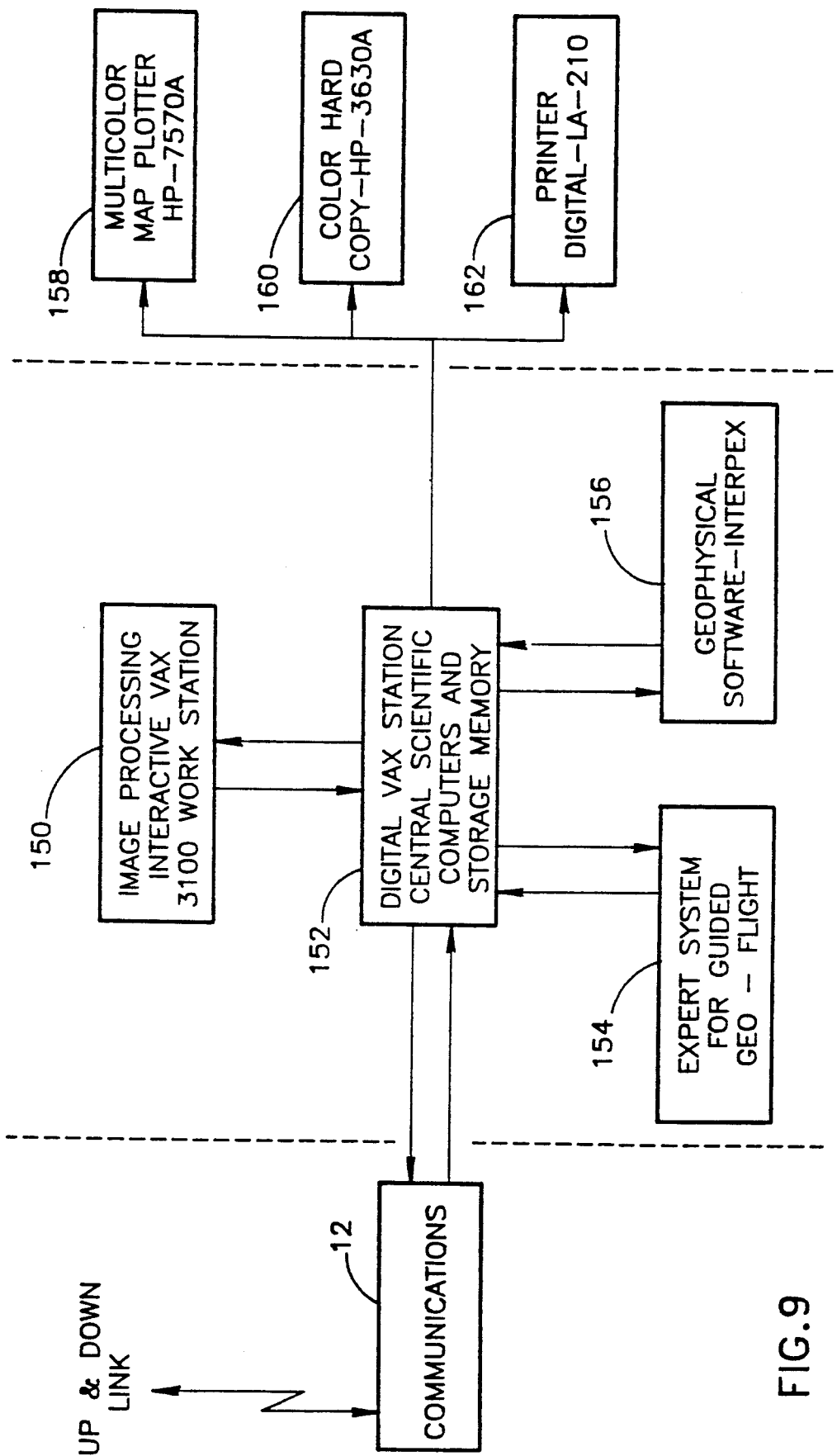
FIG. 9 is a simplified block diagram of a ground unit forming part of the system of FIG. 1.

Reference is now made to FIG. 9, which illustrates in simplified block diagram form the ground portion 22 of the apparatus of FIGS. 1 and 2 including the geophysical survey post 14 (FIG. 1).

The geophysical survey post 14 preferably comprises an image processing interactive work station 150 such as a Digital Vax 3100 work station. Work station 150 interfaces with central scientific computer and storage memory apparatus 152, which may include digital computers such as the Vaxserver 3400 and VS 3100. Apparatus 152 interfaces via tracking and communication unit 12 with the airborne vehicle 10 and its payload.

The computer and storage memory apparatus 152 is operated by an expert system for guided survey flight 154, and by geophysical survey software 156, such as the Interpex package from Interpex Ltd. of Golden, Colo. Computer apparatus 152 interfaces with the following output apparatus: a multicolor map plotter 158, such as HP-7570A, commercially available from Hewlett-Packard, a color hard copy printer 160, such as an HP-3630A, also from Hewlett-Packard, and a data printer 162, such as a Digital LA210 Model.

Figure 10:
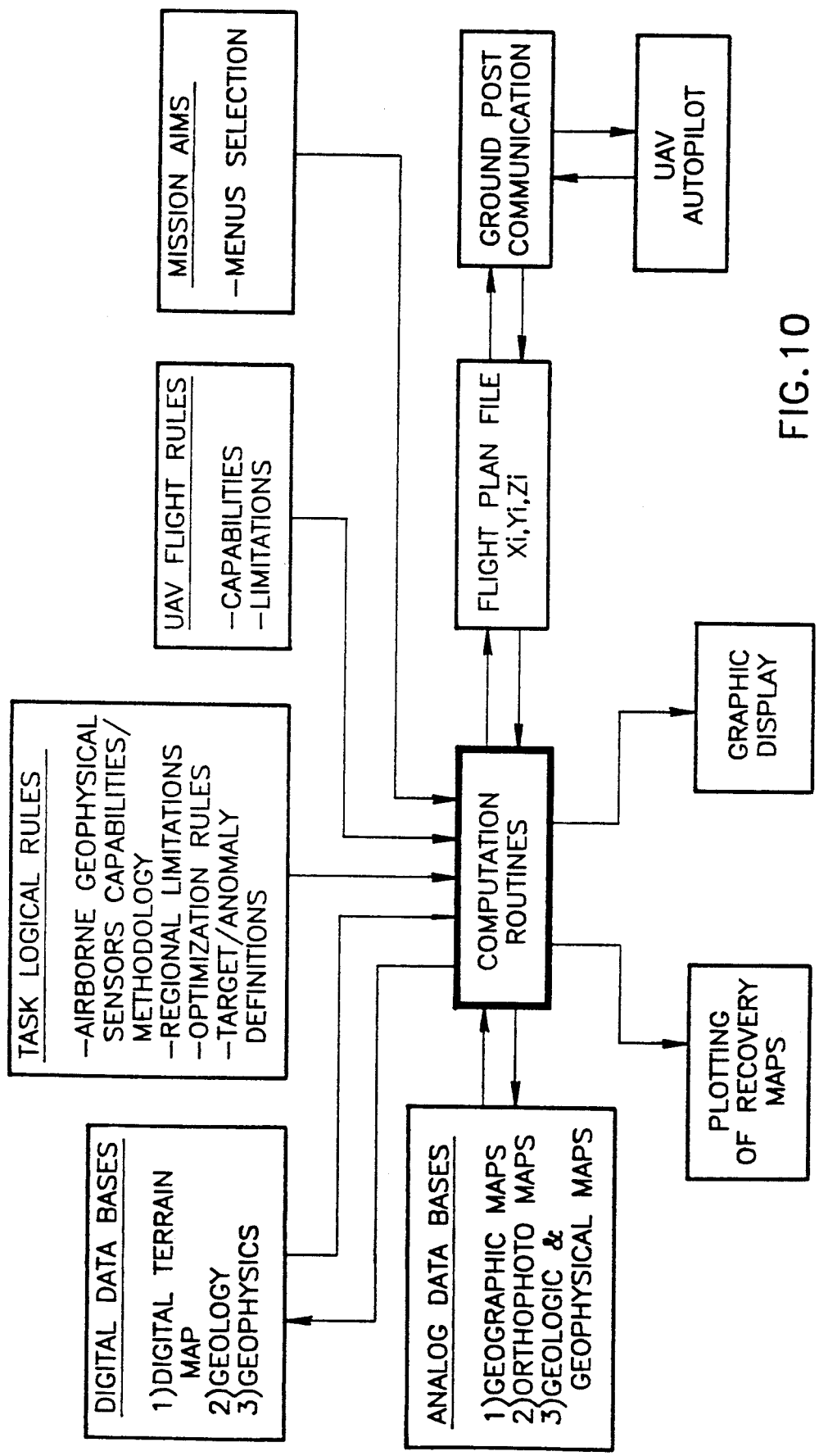
FIG. 10 is a software diagram illustrating the operation of the apparatus of FIG. 9.

Reference is now made to FIG. 10 which is a simplified software diagram of the system described in FIG. 9. The software has modules comprising digital data bases, task logical rules, UAV flight rules, mission aims, analog data bases, plotting of recovery maps, graphic display and ground post information.

Figure 11:
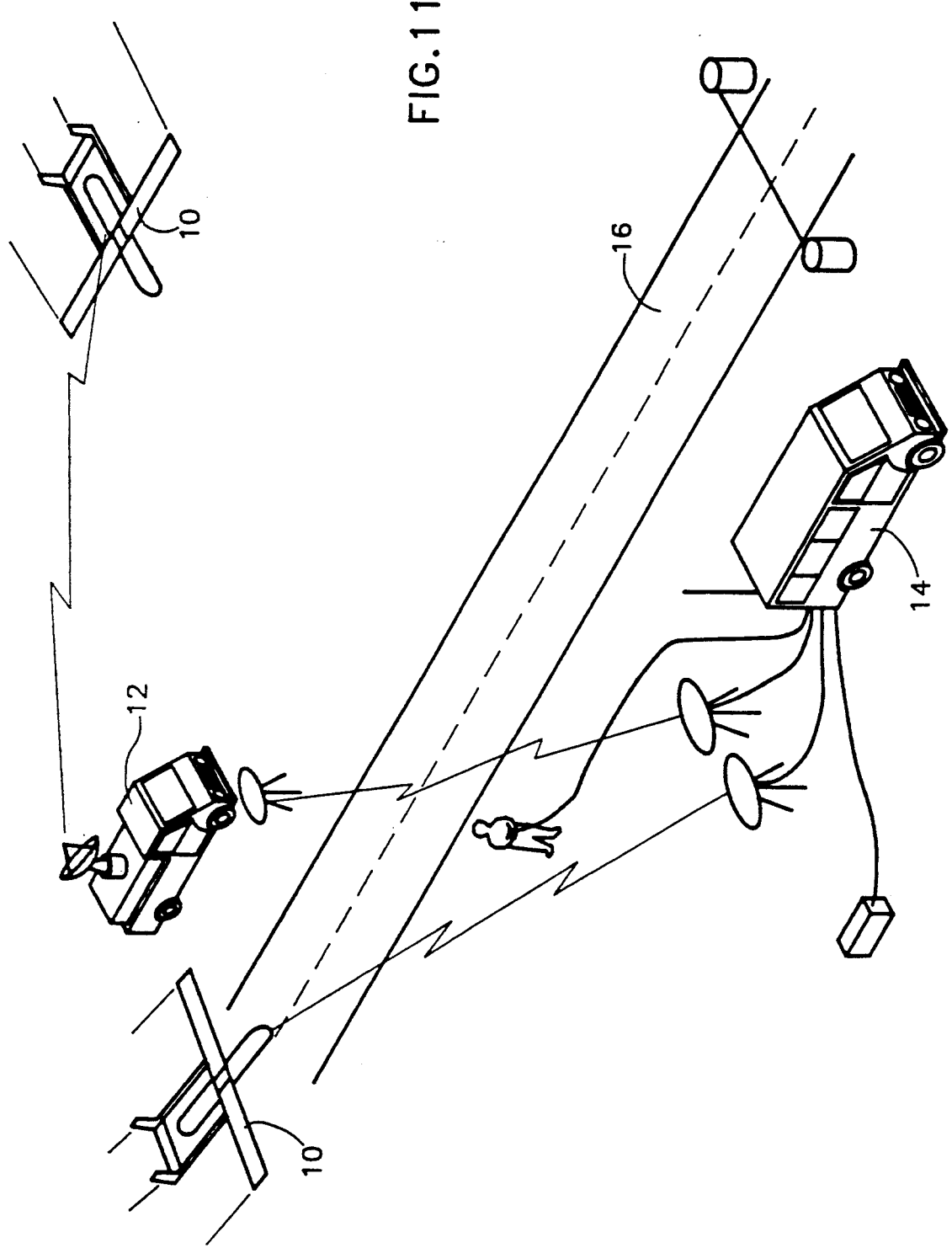
FIG. 11 is a pictorial illustration of an extended range geophysical survey system constructed and operative in accordance with a preferred embodiment of the present invention.
Figure 12:
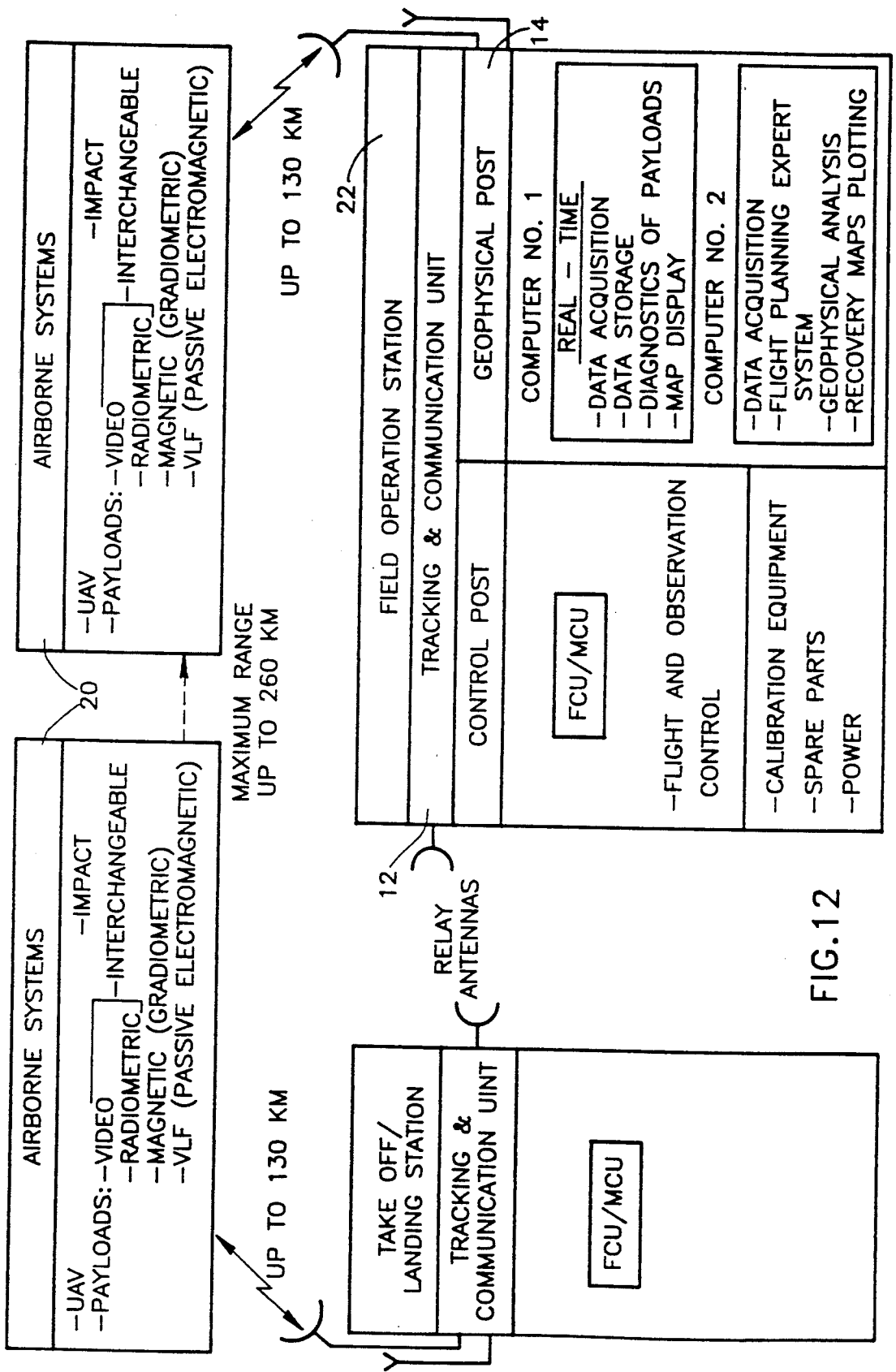
FIG. 12 is a generalized functional block diagram of the system of FIG. 11.

Reference is now made to FIGS. 11 and 12 which illustrate a variation in the system illustrated generally in FIGS. 1 and 2 wherein the tracking and communication unit 12 is remote from the geophysical survey post 14 and linked thereto by radio communication. In this configuration, which is otherwise generally the same as that illustrated in FIGS. 1 and 2, both the tracking and communication unit 12 and the geological survey post 14 may each communicate with and control a remotely piloted vehicle 10.

It will be appreciated by persons skilled in the art that the present invention is not limited to what has been particularly shown and described herein. Rather the scope of the present invention is defined only by the claims which follow:

We claim:

1. A geophysical survey system comprising:
   a remotely piloted vehicle;
   a geophysical sensing payload mounted on the remotely piloted vehicle; and
   ground based control and data receiving means which comprises a separate mobile tracking, communication and control unit and a separate mobile geophysical analysis unit physically separate from said mobile tracking, communication and control unit.

2. A geophysical survey system according to claim 1 wherein the mobile geophysical analysis unit also comprises means for real-time analysis of received geophysical data from said geophysical sensing payload.

3. A geophysical survey system according to claim 2 wherein the mobile geophysical analysis unit also comprises means for processing, interpretation and map display of geophysical data derived from said geophysical sensing payload.

4. A geophysical survey system according to claim 1 wherein said geophysical sensing payload includes a radiometric payload which comprises nuclear detection means.

5. A geophysical survey system according to claim 4 wherein said radiometric payload comprises nuclear scintillation means.

6. A geophysical survey system according to claim 5 wherein said radiometric payload also comprises means for cooling said nuclear scintillation means.

7. A geophysical survey system according to claim 6 wherein said means for cooling comprises thermoelectric means and wherein said nuclear scintillation means are located in a thermally isolated housing.

8. A geophysical survey system according to claim 1 wherein said separate units are interconnected by wireless relays.

9. A geophysical survey system according to claim 1 wherein the ground based control and data receiving means also comprises means for data processing and for guiding flight of said remotely piloted vehicle.

10. A geophysical survey system comprising:
    a remotely piloted vehicle;
    a geophysical sensing payload mounted on the remotely piloted vehicle;
    ground based control and data receiving means which comprises a separate mobile tracking, communication and control unit and a separate mobile geophysical analysis unit physically separate from said mobile tracking, communication and control unit; and
    wherein the separate geophysical analysis unit includes means for processing, interpretation and map display of geophysical data derived from said geophysical sensing payload.

11. A geophysical survey system according to claim 10 wherein said geophysical sensing payload comprises a bismuth germanium oxide (BGO) type radiometric payload.

12. A geophysical survey system according to claim 10 wherein the mobile geophysical analysis unit also comprises means for real-time analysis of received geophysical data from said geophysical sensing payload.

13. A geophysical survey system according to claim 10 wherein said geophysical sensing payload comprises nuclear detection means.

14. A geophysical survey system according to claim 10 wherein said geophysical sensing payload comprises nuclear scintillation means.

15. A geophysical survey system according to claim 14 wherein said geophysical sensing payload also comprises means for cooling said nuclear scintillation means.

16. A geophysical survey system according to claim 15 wherein said means for cooling comprises thermoelectric means and wherein said nuclear scintillation means are located in a thermally isolated housing.

17. A geophysical survey system according to claim 10 wherein said separate units are interconnected by wireless relays.

18. A geophysical survey system comprising:
a remotely piloted vehicle;
a geophysical sensing payload comprising a radiometric payload mounted on the remotely piloted vehicle and weighing no more than 20 kg; and
ground based control and data receiving means which comprises a separate mobile tracking, communication and control unit and a separate mobile geophysical analysis unit physically separate from said mobile tracking, communication and control unit.

* * * * *